April 29, 1958  P. BERNARD  2,832,203
LIQUID FLOW DEVICE WITH AN ALMOST CONSTANT DELIVERY
Filed March 10, 1955  2 Sheets-Sheet 1
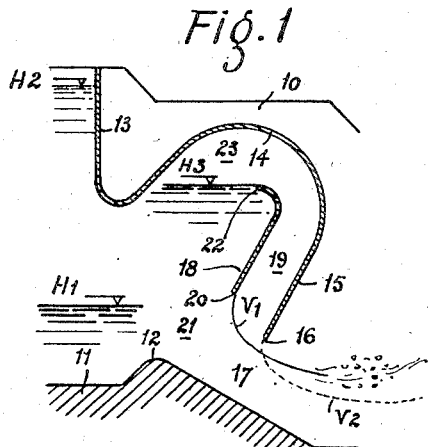
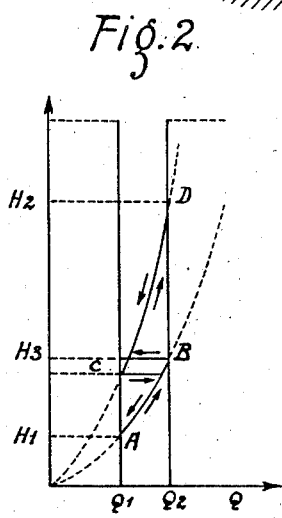
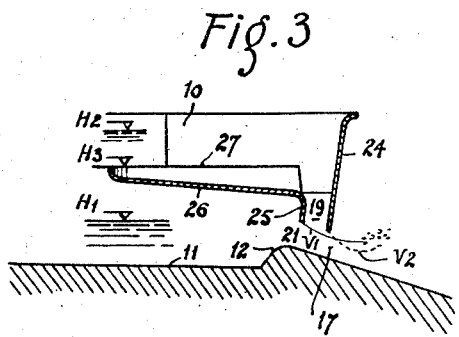
INVENTOR
PAUL BERNARD
BY Young, Emery + Thompson
ATTYS.

April 29, 1958   P. BERNARD   2,832,203
LIQUID FLOW DEVICE WITH AN ALMOST CONSTANT DELIVERY
Filed March 10, 1955   2 Sheets-Sheet 2

INVENTOR
PAUL BERNARD
BY Young, Emery & Thompson
ATTYS.

2,832,203

LIQUID FLOW DEVICE WITH AN ALMOST CONSTANT DELIVERY

Paul Bernard, Casablanca, Morocco

Application March 10, 1955, Serial No. 493,495

Claims priority, application Morocco March 18, 1954

4 Claims. (Cl. 61—18)

The present invention has for its object a liquid-flow device which enables the said flow to be maintained at an almost constant rate of delivery in spite of a large variation in the level of water on the upstream side or of the head from which it is fed.

This device is characterised in that there are associated with the normal flow orifice one or a plurality of orifices arranged on the downstream side of the normal orifice, the said orifices being supplied in succession with liquid when the level of water on the upstream side or the head rises.

When the upstream level remains less than a certain height, the rate of flow is ensured by the normal flow orifice. When the level rises, the liquid passes into the second orifice and pours out on the downstream side in the form of a jet into the body of water being discharged from the first orifice. This jet due to the second orifice varies the law of flow and produces a reduction in the rate of delivery which compensates for the variation in the height of fall. The same set of conditions are created, if this is necessary, by a third orifice arranged on the downstream side of the second orifice, and so on.

The successive orifices associated with the normal flow orifice are connected to conduits which constitute siphons originating at successive heights of the level of water, or at spill-ways located at different heights.

An arrangement of this kind does not comprise any moving member. Its construction is simple and does not require any considerable amount of work for its installation. It gives rise to only a very small loss of pressure. It is not affected by the level on the downstream side. A device of this kind finds its application in all cases in which it is desired to regulate the rate of flow of liquid. It is of special advantage for the equipment of irrigation installations.

The invention and its special features will be more fully described with reference to the attached drawings. In these drawings:

Fig. 1 shows in longitudinal cross-section the arrangement in accordance with the invention installed in a channel having a single orifice on the downstream side;

Fig. 2 is an explanatory diagram;

Figure 4:
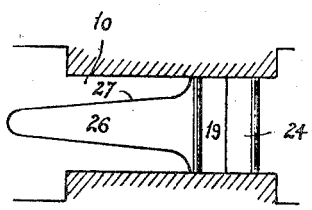
Figure 5:
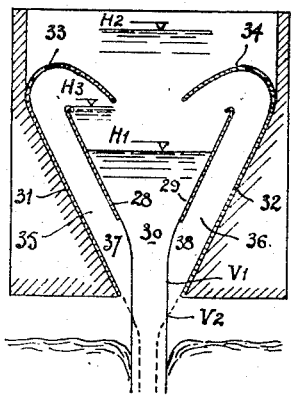
Figure 6:
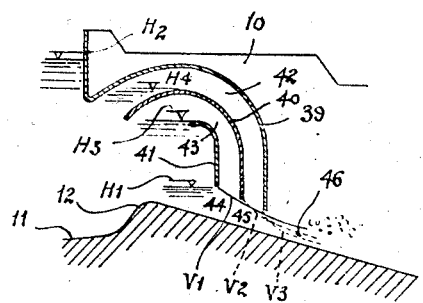
Figure 7:
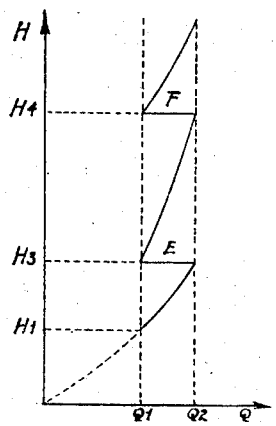

Fig. 3 relates to a further form of embodiment;

Fig. 4 is a plan view of the arrangement of Fig. 3;

Fig. 5 is a further embodiment of the device;

Fig. 6 shows an arrangement with a number of orifices;

Fig. 7 is an explanatory diagram.

In Fig. 1 is shown in longitudinal cross-section a conduit 10, the floor 11 of which has a sill 12. At an appreciable height above the sill 12 in the conduit 10 is provided a surface 13, which may be vertical or inclined and which serves to shut off a portion of the conduit. To this surface 13 is coupled a curved surface 14 which extends in the form of a flat or incurved surface 15. The portion 15 terminates at 16 in such a manner that between the floor 11 and the point 16, there is formed an orifice 17 which is the downstream orifice.

Inside the surface 14, 15, is arranged a further surface 18 which is spaced apart from the surface 14, 15, so as to constitute a passage 19. Between the lower extremity 20 of the surface 18 and the floor 11 is formed a space 21 which constitutes the normal flow orifice situated on the upstream side. In this way, the whole of the surfaces 15 and 18 constitutes the arrangement having two flow orifices 17 (the auxiliary orifice) and 21 (the normal orifice).

Between the upper extremity 22 of the surface 18 and the surface 14, there is formed a passage 23 through which the liquid may flow when the level on the upstream side reaches the edge 22 of the surface 18, the combination of the passages 23 and 19 forming a siphon which discharges the liquid between the orifices 21 and 17.

The properties of the arrangement which has just been described result from the following considerations:

There will be represented by H the height of the level on the upstream side, which is supposed to be variable between a minimum height $H_1$ and a maximum height $H_2$. At the level of the upper extremity 22 of the surface 18, the height of the level of the liquid will be represented by $H_3$.

As long as the height H remains between $H_1$ and $H_3$, the delivery Q is discharged through the single orifice 21 as a free jet such as indicated by $V_1$. The variation of the rate of this flow follows a law which is defined by:

$$Q = CSH^{1/2}$$

in which:

S is the cross-section of passage of the orifice 21,
H is the height on the upstream side,
C is the coefficient of contraction.

When the level on the upstream side exceeds the height $H_3$, the siphon 23, 19, becomes operative and the liquid flows away on the downstream side of the orifice 21 in the contracted section of the jet $V_1$. The discharge takes place through the downstream orifice 17 as a jet represented by the line $V_2$ following a rate of flow Q:

$$Q = C'S'H^n$$

in which:

$S'$ is the cross-section of passage of the orifice 17,
$C'$ is a coefficient of contraction, different from C,
$n$ has a value less than ½, because of the disturbing influence of the jet injected through the conduit 19.

The variations of the rate of flow Q as a function of the height H are shown on the diagram of Fig. 2. It will be seen that when the height H varies from $H_1$ to $H_2$, the rate of flow Q follow sthe path, A, B, C, D, the break in continuity B—C corresponding to the setting in operation of the siphon 19, 23. The rate of flow remains practically between the values $Q_1$ and $Q_2$, which may be made as close together as may be desired by a judicious choice of the dimensions.

In the arrangement shown in Figs. 3 and 4, the normal orifice is again shown at 21 and the downstream orifice at 17. The downstream orifice 17 is defined by a vertical or inclined wall 24. The inside surface 25 is extended to form a wall 26 which is connected to the weir 27. This weir is located at the height $H_3$ and when the level of the liquid reaches this height, it supplies the conduit 19 to produce the jet $V_2$.

In the forms of embodiment which have been described above, the normal orifice 21 and the downstream orifice 17 are horizontal or only slightly inclined. Fig. 5 shows an arrangement of the same kind as that shown in Fig. 1 with the downstream orifices supplied by siphons, the arrangement being symmetrical and being provided with vertical orifices for a vertical flow of liquid.

The device consists of two walls 28, 29, the lower edges of which form part of the normal flow orifice 30 for the jet $V_1$. Lateral walls 31, 32, with incurved upper edges 33 and 34 form, together with the walls 28, 29, conduits 35, 36, which terminate on the downstream side in the symmetrical orifices 37, 38, producing the jet $V_2$.

The arrangement shown in Fig. 6 is similar to that of Fig. 1, but it consists of three successive walls 39, 40 and 41 which form two siphons 42 and 43 and three downstream orifices: the normal flow orifice 44 followed by two downstream orifices 45 and 46 which operate in succession and give rise to the formation of jets $V_1$, $V_2$ and $V_3$. With this arrangement, the variation of the rate of flow Q (see Fig. 7) remains included between $Q_1$ and $Q_2$ by virtue of two successive discontinuous portions E and F, which correspond to the heights $H_3$ and $H_4$ at which the siphons 43 and 42 come into operation.

It will be seen that in all cases, the rate of flow remains included between the values $Q_1$ and $Q_2$ and that it may thus be maintained almost constant, the effect of the jets from the siphons impinging transversely on the normal flow, thus effecting a reduction in the rate of flow and compensating for the increase due to the height of the level of water on the upstream side.

The cross-sections of the orifice or orifices on the downstream side may, depending on the case, be less than, equal to or greater than that of the upstream orifice. Since the flow is in the nature of a torrent, the rate of flow of the device is practically not affected by any operations on the downstream side.

It will of course be understood that the device in accordance with the invention may be utilised as a flow-limiter. As it allows all rates of flow less than $Q_2$ (see Fig. 7) to pass, if the rate of flow in the conduit 10 exceeds this value, the level rises on the upstream side. By the provision of a spill-way, siphon or other safety arrangement which passes-off the liquid when the maximum height $H_2$ is reached, the rate of flow cannot exceed the value chosen.

What I claim is:

1. A liquid flow device having almost constant rate of flow and comprising, between the level of water on the upstream side and the level of water downstream: a first wall spaced apart from the floor and forming therewith a flow orifice, the said wall extending at its upper part up to a predetermined level; at least one second wall arranged on the downstream side of the first wall and having a lower edge spaced apart from the floor and constituting with the said first wall a flow channel discharging substantially transversely to the normal flow of the first said orifice, the second wall extending above the upper edge of the first wall, the flow channel between the two walls being supplied with liquid as soon as the level of the said liquid reaches the upper edge of the first said wall.

2. A liquid flow device having an almost constant rate of flow and comprising, between the level of water on the upstream side and the level of water downstream: a first wall spaced apart from the floor and forming therewith a flow orifice, the said wall being extended at its upper part up to a predetermined level; at least one second wall arranged on the downstream side of the first wall and with its lower edge spaced apart from the floor and forming with the first said wall a flow channel adapted to discharge substantially transversely to the normal flow of the first said orifice, the second wall being extended above the upper edge of the first wall and being curved back to form a siphon, the said siphon being supplied with liquid as soon as the level of the said liquid reaches the upper edge of the first wall.

3. A liquid flow device having an almost constant rate of flow and comprising, between the level of water on the upstream side and the level of water downstream: a first wall spaced apart from the floor and forming therewith a flow orifice, the said wall being extended at its upper part up to a predetermined level; at least one second wall arranged on the downstream side of the first wall and with its lower edge spaced apart from the floor and forming with the first said wall a flow channel adapted to discharge substantially transversely to the normal flow of the first said orifice, the second wall being extended above the upper edge of the first wall; a spillway located at the level of the upper edge of the first wall and adapted to supply the flow channel formed between the two said walls.

4. A liquid flow device having an almost constant rate of flow and comprising, between the level of water on the upstream side and the level of water downstream: a first wall spaced apart from the floor and forming therewith a flow orifice, the said wall being extended at its upper part up to a predetermined level; a plurality of walls arranged on the downstream side of the first wall and having their lower edges spaced apart from the floor so as to form a succession of flow channels adapted to discharge transversely to the normal flow of the first orifice, the said walls being extended upwards to different levels higher than the upper edge of the first said wall, the said channels being supplied in succession with liquid as the liquid level rises on the upstream side.

References Cited in the file of this patent
UNITED STATES PATENTS

| | | |
|---|---|---|
| 1,012,072 | Gibb | Dec. 19, 1911 |
| 2,130,936 | Thompson | Sept. 20, 1938 |